Jan. 13, 1942.   L. J. DE HOLCZER   2,269,441
CLOSURE
Filed Oct. 29, 1940
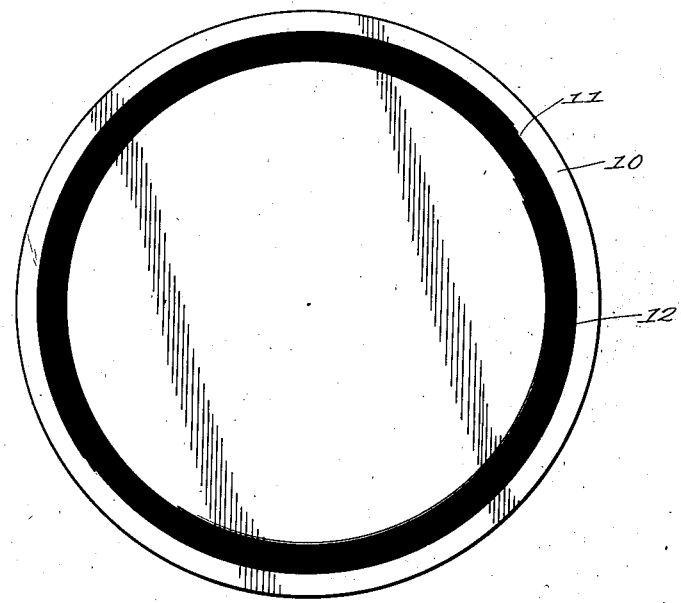
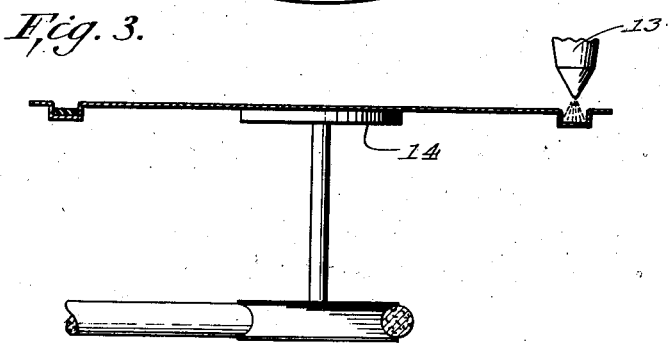
Inventor
Louis J. De Holczer
By Cushman Darby & Cushman
Attorneys Patented Jan. 13, 1942

2,269,441

UNITED STATES PATENT OFFICE 2,269,441

CLOSURE

Louis J. De Holczer, Baltimore, Md., assignor to Crown Cork & Seal Company, Inc., Baltimore, Md., a corporation of New York Application October 29, 1940, Serial No. 363,350

1 Claim. (Cl. 215—38)

This invention relates to container closures and a method of making the same.

The principal object of the invention is to provide a closure having firmly adhered thereto an improved sealing material. The sealing composition is adhesive and spreadable and includes a rubber substance, e. g., dispersed rubber and a vulcanizing compound containing combined sulfur. From this material there is deposited a sealing film or layer which is dried and cured and in which any sulfur present is in combined form.

Another object of the invention is to provide a closure having such a sealing material characterized by the absence of free sulfur. That is, the sulfur is present before and after vulcanization in inert or innocuous combined form and during vulcanization is liberated in predetermined amount and in highly reactive nascent condition so that it completely and substantially instantaneously combines with the rubber without leaving a free sulfur residue.

By so eliminating free sulfur, there is no opportunity for reaction between the sealing material and the closure wall such as would disintegrate the latter and discolor or otherwise injure the product being sealed. Moreover, the tendency of free sulfur to react with the contents and objectionably affect the flavor and appearance of such products as foods and beverages is eliminated.

A further object of the invention is to provide a closure having adhered thereto a sealing composition which is self-curing. The sealing composition is rapidly dried and cured upon mere exposure to air, and such simultaneous drying and curing may be accelerated by heating.

It is an additional object of the invention to provide a closure having tenaciously adhered thereto a sealing film or layer of desired body or solids content which is resilient, elastic, flexible and in the form of a strongly coherent mass having high tensile strength. A very important characteristic of the sealing material is its improved ageing properties, and the ability of the seal to withstand pasteurization and sterilizing temperatures, water, acids and alkalies.

Of equal importance, it is an object of the invention to provide an improved method of forming a closure with a sealing film or layer deposited from a spreadable aqueous dispersion of a rubber substance and a vulcanization agent including combined sulfur wherein the sealing material of suitable viscosity and solids content is (1) flowed into the sealing groove, for example, of a container cap, can end, or top and (2) simultaneously dried and vulcanized in the presence of air either at normal temperature or at elevated temperature by liberation of nascent sulfur in predictable predetermined amount to be immediately completely combined with the rubber substance without leaving a free sulfur residue. The deposited sealing film or layer is uniform in thickness, vulcanized throughout its mass and occupies the area of the groove to the desired depth. The dried, vulcanized seal presents a smooth continuous sealing surface to the lip of the receptacle upon which the closure is applied. The vulcanization and drying take place in situ and the seal is tenaciously adhered to a closure wall of metal, glass, paper, or of synthetic composition such as cellulose plastics and resins.

The sealing material possesses differences and advantages not heretofore found in customary rubber compositions for this purpose. For instance, free sulfur in substantial amount of 2½% or more based on the rubber has been heretofore consistently employed to bring about vulcanization. Efforts by rubber compounders to reduce the amount of sulfur, say to about $\frac{1}{10}$ of 1% or less by increasing the quantity of accelerating agent have not eliminated the objections above noted to the presence of free sulfur. The present invention (1) excludes the presence of free sulfur and (2) in addition, the quantity of sulfur required (and hence the quantity of curing agent) is predetermined and is relatively small, being usually below $\frac{5}{10}$ percent.

While I believe that the physical and chemical structure of the rubber particles, e. g., latex or dispersed rubber undergoes substantial modification incident to vulcanization, this does not appear to be material insofar as the efficiency of the vulcanized rubber as a sealing material is concerned. The important consideration is to provide a sealing material and a method of applying the same to a closure so that a vulcanized sealing layer or film of required solids content, thickness and area is tenaciously adhered to the closure wall, which sealing material at no time presents the objections occasioned by the presence of available free sulfur.

The rubber composition includes as the vulcanizing agent a sulfur compound which in admixture with a rubber dispersion will liberate a predictable predetermined amount of nascent sulfur upon mere exposure to air or upon heating to assure vigorous combination of the sulfur and rubber molecules and produce curing of the deposited composition rapidly throughout its mass. Vulcanizing agents of this character are available and I have found, for example, that a polysulfide compound is very suitable, since it is capable in the presence of air and normal temperatures or at elevated temperatures of liberating one or more molecules of sulfur of such a highly reactive character as to instantaneously and completely combine with the rubber molecules. The possibility of producing free sulfur is thus eliminated in the unvulcanized, partially vulcanized and completely vulcanized sealing composition.

As illustrative of preferred vulcanizing agents, I use thiuram sulfides, such as dipentamethylene-thiuram-tetrasulfide or tetramethyl-thiuram-disulfide; in fact, any polysulfide or sulfide containing chemical compound which is inert and innocuous to the container and its contents and capable of liberating a predictable amount of highly reactive sulfur when admixed in the rubber dispersion may be employed.

Preferably, the composition is maintained alkaline to prevent coagulation of the rubber due to the presence of acidifying substances and to impart the self-curing property to the composition. This latter result I find is produced by using an acid accelerator and an acid curing agent in an alkaline composition. Thus, the vulcanization reaction proceeds vigorously when the composition is merely exposed to air, for example, at normal temperatures and is even more rapid at elevated temperature.

The accelerator or combination of accelerators are well known compounds, and are preferably agents which are compatible with the vulcanizing agent such as tetramethylthiurammonosulfide.

The alkalinity of the composition is assisted by the presence of a suitable alkali such as sodium hydroxide in small percentage which will keep the negative charge on the latex so as to prevent coagulation and which will also accelerate the curing. Suitable fillers as well as an antioxidant, a dispersing agent to maintain a uniform dispersion and a thickener such as casein, all as understood in the art of rubber compounding, are included in the composition. The viscosity and solids content of the composition are readily controllable by determining the concentration of the aqueous dispersion which may vary from a thin, adhesive liquid to a somewhat thick or semiplastic adhesive dough. Preferably, the composition has a viscosity which will enable it to be discharged from a nozzle in a spreadable state and flowed into the sealing groove or other part of a closure to deposit on drying and curing a film or layer having a desired solids content.

As illustrative of a satisfactory composition, the following example has been found to give satisfactory results:

| | Parts |
|---|---|
| Rubber latex (rubber 60–65%) | 170 |
| Zinc oxide | 40 |
| Barium sulfate | 25 |
| Tetramethylthiurammono sulfide | 1 |
| Dipentamethilenethiuram tetrasulfide | 2 |
| Neozone-D | .5 |
| Dispersing agent | 2.5 |
| Casein | 1.5 |
| Sodium hydroxide | .5 |
| Distilled water | 25 |

The above rubber dispersion is self-curing. When the fluid mass is compounded, it must be stored with complete exclusion of air. Preferably, the storage takes place in a closed container in an atmosphere of ammonia, for example, and vulcanization is retarded by the absence of air. When, however, the composition is flowed or sprayed onto a closure, its exposure to air produces rapid curing and drying simultaneously and, as stated above, these effects are accelerated by elevated temperature.

The relationship of the ingredients may, of course, be modified to produce a seal of varying solids content, hardness and curing and drying time.

The various compounding agents are capable of wide selection, since numerous chemical companies have the ingredients available. It is, therefore, only necessary that they be combined in proper proportion to accomplish the new method of forming a closure with an adhered sealing film or layer and wherein a self-curing composition is obtained which is devoid of free sulphur throughout its fluid, semi-fluid and solid states.

Referring to the drawing,

Figure 1 is a sectional view of a metal cap having a sealing groove provided with a layer of sealing material as described herein;

Figure 2 is a plan view of the cap of Figure 1; and

Figure 3 is a diagrammatic view showing the manner in which the composition is flowed into and spread in the sealing groove.

While I have illustrated a particular type of cap top, it is to be understood that the invention is applicable to closures of various forms and made of various materials.

Referring to Figure 1, the cap is illustrated at 10 and is provided with a sealing groove 11 in which is disposed a vulcanizing sealing layer or film 12 deposited from the rubber dispersion. By means of a suitable nozzle 13, the compound of this invention is flowed into the sealing groove preferably while the cap is rotating upon the support 14. The nozzle valve is shut off after a predetermined number of revolutions and the cap automatically removed and another cap positioned on the rotating support.

The sealing composition supplied by the nozzle 12 is in a spreadable state so that it completely fills the groove to the desired depth with a uniform thickness of material. The sealing film or layer 12 is dried and vulcanized simultaneously by mere exposure to air or at elevated temperature. Vulcanization takes place throughout the thickness of the layer of sealing material which, in effect, is homogeneous and coherent, and adheres with great tenacity to the wall of the groove in which it forms a continuous seal having a smooth surface.

The term "rubber dispersion" as used in the appended claims is intended to include rubber latex, dispersed rubber, as well as various synthetic rubber materials.

I claim:

A closure having a sealing layer of vulcanized rubber adhered to the closure, said layer being characterized by being deposited from a rubber dispersion including a sulphur bearing vulcanizing compound, by the absence of free sulphur and by presenting a smooth continuous sealing surface, said dispersion containing an amount of sulphur bearing vulcanizing compound effective during vulcanizing of the rubber to liberate sulphur below .5% of the rubber in highly reactive nascent condition and combine with the rubber to vulcanize the same without leaving a free sulphur residue and forming a resilient, flexible sealing layer which is strongly coherent, has high tensile strength and is tenaciously adhered to the closure after vulcanization.

LOUIS J. DE HOLCZER.